United States Patent
Syrjälahti et al.

(10) Patent No.: US 9,730,178 B1
(45) Date of Patent: Aug. 8, 2017

(54) METHOD AND SYSTEM FOR IDENTIFYING A LOCATION OF A CONTAINER WITHIN A GROUP OF CONTAINERS

(71) Applicant: Enevo Oy, Espoo (FI)

(72) Inventors: Mikko Syrjälahti, Espoo (FI); Pirkka Palomaki, Helsinki (FI); Fredrik Kekäläinen, Espoo (FI)

(73) Assignee: Enevo Oy, Espoo (FI)

( * ) Notice: Subject to any disclaimer, the term of this patent is extended or adjusted under 35 U.S.C. 154(b) by 0 days.

(21) Appl. No.: 15/236,906

(22) Filed: Aug. 15, 2016

(51) Int. Cl.
- *H04W 64/00* (2009.01)
- *H04W 60/04* (2009.01)
- *H04L 29/08* (2006.01)
- *H04L 29/06* (2006.01)
- *H04W 84/12* (2009.01)
- *H04W 88/08* (2009.01)

(52) U.S. Cl.
CPC .......... *H04W 60/04* (2013.01); *H04L 67/18* (2013.01); *H04L 67/42* (2013.01); *H04W 64/006* (2013.01); *H04W 84/12* (2013.01); *H04W 88/08* (2013.01)

(58) Field of Classification Search
CPC ....... H04W 4/005; H04W 4/021; H04W 4/04; H04W 4/02; G01S 5/16; H05B 33/0845; H04B 10/116; H04B 10/166; G06F 19/3493; G06F 17/30345; G06F 17/30241; G06F 17/30554; A01G 1/001; G06Q 50/02; G06Q 10/02; G06Q 30/0269
USPC ......... 455/456.1, 405, 550.1, 41.3; 709/223; 340/573.4, 568.2; 370/230
See application file for complete search history.

(56) References Cited

U.S. PATENT DOCUMENTS

| | | | | |
|---|---|---|---|---|
| 7,206,585 B2* | 4/2007 | Gilham | ............... | G08G 1/0104 340/995.1 |
| 7,889,071 B2* | 2/2011 | Theimer | ................. | G01W 1/00 340/539.13 |
| 2003/0154055 A1 | 8/2003 | Yoshimura | | |

OTHER PUBLICATIONS

"Ambient Intelligence and Future Trends—International Symposum on Ambient Intelligence(ISAmI2010)" Juan Carlos Augusto et al., Series: Advances in Intelligent and Soft Computing (Book 72), Publisher: Springer; 2010 edition (May 17, 2010), ISBN-10: 3642132677, ISBN-13: 978-3642132674, Relevant p. 32.

* cited by examiner

*Primary Examiner* — Phuoc H Doan
(74) *Attorney, Agent, or Firm* — Ziegler IP Law Group, LLC

(57) ABSTRACT

Disclosed is a method for identifying location of a first container within a group of containers. Each container has an identification code and includes a sensor unit. The sensor unit includes communication means and a movement detector. The method includes at least a first sensor unit of the first container transmitting a first message including a first identification code of the first container, and at least one communication module receiving the first message. The at least one communication module analyzes the received first message, compares the received first identification code to a list of stored identification codes, updates the list of stored identification codes by addition of the first identification code when the first identification code is absent from the list, and transmits a second message to a server, the second message including the first identification code for the server to update the location of the first container.

15 Claims, 3 Drawing Sheets

METHOD AND SYSTEM FOR IDENTIFYING A LOCATION OF A CONTAINER WITHIN A GROUP OF CONTAINERS

TECHNICAL FIELD

The present disclosure relates generally to location sensing; and more specifically, to a method and system for identifying a location of a first container within a group of containers.

BACKGROUND

Conventionally, sensors may be used for applications such as tracking motion (for example, velocity of an object), for measuring temperature, pressure, fill level, and so forth. Such applications may require mounting of sensors on objects such as containers. Further, measured data using sensors may also be transmitted to remote users or devices for subsequent analysis. Typically, containers that may be mounted with sensors may also be movable.

Some applications such as garbage collection using fill level sensors on containers, may require information of location of the containers. In an example, garbage collection may be typically performed by handlers (or service personnel) using predetermined schedules, or according to amount of garbage in containers. Also, the containers may be of various types depending upon type of garbage collected therein. For example different types of containers may be used for collection of biodegradable waste, plastics, chemical wastes and so forth. The displacement of a garbage container from its original location to another can increase costs, inconvenience and time for garbage collection along with an increased probability of waste disposal in an incorrect garbage container.

Typically, the location of containers may be identified and tracked using sensors such as Global Positioning System (or GPS) sensors, cell-tower-based location sensors, Wi-Fi-based location sensors and so forth. Location tracking of containers using GPS sensors may lead to high costs and increased battery consumption. Further, GPS sensors cannot be implemented for location tracking of metallic containers, indoor containers, and containers placed under metallic roof structures, or between dense buildings. Cell-tower-based location tracking of containers requires the presence of a modem to estimate the location of the containers using the location of cellular towers in the area. The estimated location may be inaccurate, and use of the modem may increase energy consumption. Wi-Fi-based location tracking systems require the presence of a Wi-Fi access point which may not be available at all places. Further, access to a database of the Wi-Fi access point positions may be required to get accurate locations of containers. Additionally, signal fluctuations in Wi-Fi-based location tracking systems may increase the inaccuracy and errors in location determination.

Therefore, in light of the foregoing discussion, there exists a need to overcome the aforementioned drawbacks associated with identifying and tracking location of containers.

SUMMARY

The present disclosure seeks to provide a method for identifying a location of a container within a group of containers. The present disclosure also seeks to provide a system for identifying a location of a container within a group of containers. The present disclosure seeks to provide a solution to the existing problems in identification of location of a container within a group of containers. An aim of the present disclosure is to provide a solution that overcomes at least partially the problems encountered in prior art, and provides a cost effective, energy efficient and reliable solution for detecting location of a container within a group of containers.

In one aspect, an embodiment of the present disclosure provides a method for identifying a location of a first container within a group of containers, each container comprising a sensor unit, the sensor unit comprising communication means and a movement detector, each container having an identification code, the method comprising:
- at least a first sensor unit of the first container transmitting a first message including a first identification code of the first container, using a first type of transmission means,
- at least a second communication module
  - receiving the first message including the first identification code, and
  - analysing the received first message to determine that the first container comprising the first sensor unit is in proximity of the at least second communication module,
  - comparing the received first identification code to a list of stored identification codes,
  - updating the list of stored identification codes by addition of the first identification code when the first identification code is absent from the list, and
  - transmitting a second message to a server, the second message including the first identification code for the server to update the location of the first container, using a second type of transmission means.

In another aspect, an embodiment of the present disclosure provides a container system comprising:
- a plurality of containers, each container comprising a sensor unit, the sensor unit comprising a movement detector and communication means, the movement detector being configured to detect movement of the container from a first location to a second location,
- a server comprising communication means,
- at least a second communication module configured to
  - receive a first message from a first sensor unit, the message including a first identification code,
  - analyse the received first message to determine that the first container comprising the first sensor unit is in proximity of the at least second communication module,
  - compare the received first identification code to a list of stored identification codes,
  - update the list of stored identification codes by addition of the first identification code when the first identification code is absent from the list, and
  - transmit a second message to the server including the first identification code for the server to update the location of the first container.

Embodiments of the present disclosure substantially eliminate or at least partially address the aforementioned problems in the prior art, and enables reliable identification of change of location of a container within a group of containers.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
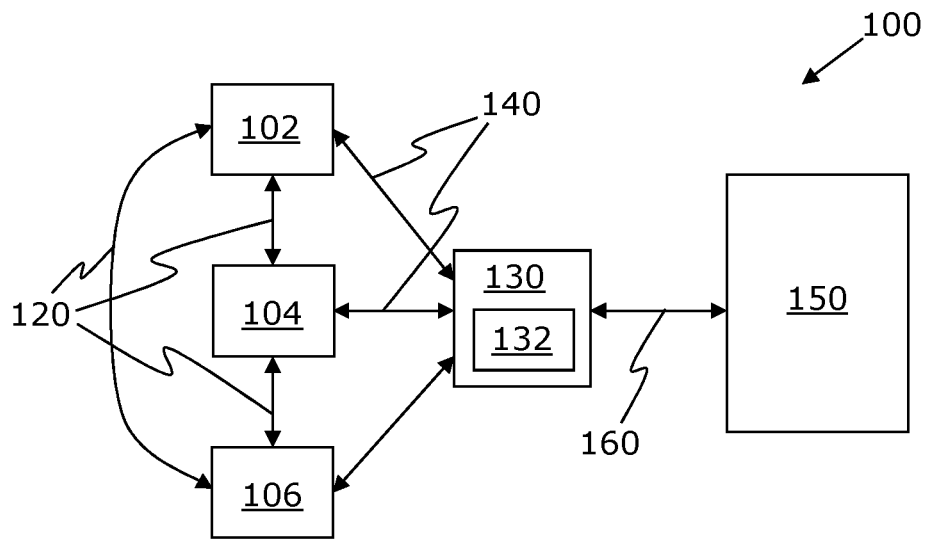
FIG. 1 is a block diagram of a system for identifying a change of location of a container within a group of containers, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for identifying a location of a first container within a group of containers, each container comprising a sensor unit, the sensor unit comprising communication means and a movement detector, each container having an identification code, the method comprising:
   at least a first sensor unit of the first container transmitting a first message including a first identification code of the first container, using a first type of transmission means,
   at least second communication module
      receiving the first message including the first identification code, and
      analysing the received first message to determine that the first container comprising the first sensor unit is in proximity of the at least second communication module,
      comparing the received first identification code to a list of stored identification codes,
      updating the list of stored identification codes by addition of the first identification code when the first identification code is absent from the list, and
      transmitting a second message to a server, the second message including the first identification code for the server to update the location of the first container, using a second type of transmission means.

In another aspect, an embodiment of the present disclosure provides a container system comprising:
   a plurality of containers, each container comprising a sensor unit, the sensor unit comprising a movement detector and communication means, the movement detector being configured to detect movement of the container from a first location to a second location,
   a server comprising communication means,
   at least a second communication module configured to
      receive a first message from a first sensor unit, the message including a first identification code,
      analyse the received first message to determine that the first container comprising the first sensor unit is in proximity of the at least second communication module,
      compare the received first identification code to a list of stored identification codes,
      update the list of stored identification codes by addition of the first identification code when the first identification code is absent from the list, and
      transmit a second message to the server including the first identification code for the server to update the location of the first container.

The present disclosure thus provides a system and a method for identifying a location of a container within a group of containers. The same system and method can be used for identifying a change of location of a container within a group of containers. This latter typically requires that a first set of positions of the containers within the container system is either determined by the system or obtained from an external source. The system may be implemented using metallic containers, and using containers placed indoors, under metallic roof structures, or between dense buildings. Further, the energy consumption and subsequently the implementation costs associated with the system are low. Additionally, as the estimated locations of containers may be further verified using a mobile communication device or a fixed communication device, the accuracy of the estimated location may be enhanced. The system and method described in the present disclosure are easy to implement and do not require a Wi-Fi access point or databases containing access point locations for functioning thereof. Further, the system and method described may also enable detection of malfunctioning and/or tampering of containers if the sensor unit of the container fails to transmit the identification code thereof.

In the present disclosure, the communication module used for identifying a location of a first container is named a second communication module (or one communication module). This is due to the fact that the communication module used for identifying the location or the change of location can be a communication module of a sensor unit of another container (in which case the communication module comprises the communication means) or a separate communication module designed for this purpose only. This will be explained in more detail below.

In the present disclosure, it is discussed the identification of location of a first container, but is it evident that the method and system can be and are usually applied to identifying location of several or even each container in a container system.

In an embodiment, the container is a vessel including a hollow body for collection of items therein. Further, the container may be of various shapes and sizes. In an embodiment, the container may be a garbage collection container. In such embodiment, the container may be used for collection of garbage, such as recyclable waste material, kitchen waste, plastics, and so forth.

Further, a plurality of containers constituting a group of containers may be placed in a particular locality for collection of items (for example, garbage) in and around the particular locality. Additionally, each container within the plurality of containers preferably has a unique identification code assigned thereto. In an embodiment, the unique identification code may be an identifier including a combination of alphanumeric and/or special characters to provide a unique identity to each container.

Typically, each container of the plurality of containers comprises a sensor unit. The sensor unit comprises a movement detector and communication means. In an embodiment, the sensor unit further comprises a fill level sensor for sensing of fill level of items within the container. In an example, the fill level sensor may be an ultrasonic sensor. Additionally, the sensor unit may comprise other sensors, such as a temperature sensor and the like.

In one embodiment, the sensor unit also comprises a microcontroller unit for controlling the movement detector, the communication means and the fill level sensor. Further, the sensor unit may include a power source such as an industrial grade lithium battery to provide electrical power to electronic and computing units within the sensor unit (for example, the movement detector, the communication means, the microcontroller unit, and the fill level sensor).

In an embodiment, components such as the sensor unit, the fill level sensor, the microcontroller unit, and so forth of the plurality of containers, may be enclosed within a housing. Further, the housing may be adapted for attachment with the container.

As mentioned above, the sensor unit comprises a movement detector. In an embodiment, the movement detector may be, include, but is not limited to, an accelerometer, a gyroscope, or a magnetometer. The movement detector may be a device configured to detect movement of the container from a first location to a second location. In an example, the container may be moved from the first location to the second location during emptying of the container, and accordingly the movement of the container may be detected by the movement detector. In an embodiment, the sensor unit may comprise more than one movement detector for higher detection accuracy.

In an embodiment, the communication means of the sensor unit may include hardware, software, firmware, or combination of these, suitable for transmitting and/or receiving communication over a network. In an embodiment, the communication means of the sensor unit may be omnidirectional. In such embodiment, a range of communication of the communication means of the sensor unit may be a circular region of a particular radius around the sensor unit. The range of communication may be directly dependent on transmission power and electronic elements associated with the sensor unit.

In one embodiment, the range of communication may be configurable by use of different transmission powers. For example, use of a lower transmission power reduces the range of communication whereas use of a higher transmission power increases the range of communication. It may be evident that the communication means of the sensor unit may be compatible with at least one communication module, in order to facilitate communication between them.

The container system of the present disclosure for identifying a location (of a first container within the container system) also comprises a server. Specifically, the server may comprise communication means for communication with sensor units of the plurality of containers and/or the at least one communication module. In an embodiment, the server may also comprise a database (or a memory unit). Specifically, the database of the server may include identification codes and locations of the plurality of containers.

In an embodiment, the at least one communication module may include hardware, software, firmware, or combination of these, suitable for communicating with the plurality of containers and/or the server. The at least one communication module may be a device, or be implemented on a device. In an embodiment, the communication module may be a fixed communication module. Specifically, the fixed communication module may be positioned at a suitable location (i.e. between the containers) within the range of communication of the communication means of the sensor units. The location of the fixed communication module may be predetermined and may be stored at the database of the server. For example, the fixed communication module may be a beacon such as iBeacon®. In another embodiment, the communication module may be portable.

In an embodiment, the communication module may be implemented on a sensor unit of a container. In another embodiment, the communication module may be a sensor unit of a container. In yet another embodiment, the communication module may be implemented on a mobile communication device.

In operation, at least a first sensor unit of the first container transmits a first message including a first identification code of the first container, using a first type of transmission means. In an embodiment, the first sensor unit transmits the first message at predefined time intervals. For example, the first sensor unit transmits the first message every 2 hours. In another embodiment, the first sensor unit transmits the first message upon request by the communication module. In yet another embodiment, the first sensor unit transmits the first message upon detection of movement of the first container from the first location to the second location.

In an embodiment, the first message may comprise the first identification code of the first container. Additionally, the first message may also comprise transmission power of the first sensor unit. Optionally, the first message may also include location of the first container, a list of identification codes of neighbouring containers of the first container, probability of movement of the first container, fill level of the first container, and so forth. In an embodiment, the term "neighbouring containers" refers to all containers within the range of communication of the communication means of the first sensor unit (of the first container). It may be evident that any container may transmit messages to and receive messages from the neighbouring containers thereof using the first type of transmission means.

In an embodiment, the first type of transmission means (of the containers) may include means suitable for transmission of messages within the range of communication of the sensor unit. Specifically, the first type of transmission means may be an interface for short range communication. Examples of the first type of transmission means include, but are not limited to Bluetooth®, Infrared communication, and Zigbee®.

The at least second communication module thereafter receives the first message including the first identification code. The communication module analyses the received first message to determine that the first container comprising the first sensor unit is in proximity of the communication module. For example, the communication module may estimate distance of the first container therefrom by analysis of signal strength (or transmission power) of the received first message. The same analysis can be carried out by another communication module, such as a communication module of a sensor unit of a container. Indeed, according to one embodiment, each container of the container system is equipped with a sensor unit that comprises a communication module capable of carrying out the analysis method. Thereafter, the server of the container system can combine the information received from each communication module to create or update the location of each of the containers.

The at least one communication module thereafter compares the received first identification code to a list of stored identification codes. For example, the at least one communication module may use a comparison module to compare the received first identification code to stored identification codes in the list. In an embodiment, the "list of stored identification codes" refers to a systematic record of identification codes of containers within a range of communication of the at least one communication module. Specifically, the list of stored identification codes may be prepared and/or updated periodically or upon detection of an event such as movement of the containers. In an embodiment, the list of stored identification codes may be stored at the at least one communication module. Alternatively, the list of stored identification codes may be stored at the server.

Further, the at least one communication module updates the list of stored identification codes. Specifically, the at least one communication module adds the first identification code to the list of stored identification codes when the first identification code is absent from the list. Therefore, presence of the first container within the range of communication of the at least one communication module is updated in the list.

It may be evident that updating the list of stored identification codes enables identification of location and/or of change of location of the first container. Specifically, the list of stored identification codes enables grouping of identification codes of all containers in proximity of the at least one communication module. Therefore, any change in the list of identification codes indicates a change in location of at least one container within the group of containers.

After updating the list of stored identification codes, the at least one communication module transmits a second message to a server, the second message including the first identification code for the server to update the location of the first container, using a second type of transmission means. Specifically, the location of the first container may be updated in the database of the server. In an embodiment, the second message is an update message for the server to update the location of the first container at the server. Specifically, the second message includes the first identification code of the first container. In an embodiment, the second message may include the updated list of stored identification codes. In an embodiment, the second message may be transmitted only when there is an update in the list of identification codes.

In an embodiment, the transmission of the second message is performed via a mobile communication device. Specifically, the mobile communication device may be a portable communication module suitable for communicating with the sensor units of the plurality of containers and/or the server. Examples of the mobile communication device include, but are not limited to, a smart-phone, a tablet computer, a laptop, and so forth.

In an embodiment, the second type of transmission means may include means suitable for transmission of messages within a range of communication of the at least one communication module. Specifically, the second type of transmission means may be associated with the at least one communication module, i.e. may be an interface for long range communication. Accordingly, the second type of transmission means may be any communication interface to facilitate the communication of the at least one communication module with the plurality of containers and/or the server. Examples of the second type of transmission means include, but are not limited to Internet, cellular network, and Low-Power Wide-Area Network (LPWAN).

In an embodiment, each sensor unit (of the plurality of containers) transmits a message including identification code of each of the containers. Subsequently, the at least one communication module receives the message or messages including the identification code(s). The at least one communication module further analyses the received message(s) to determine that the containers comprising the particular sensor units are in proximity of the at least one communication module. Thereafter, the at least one communication module compares the received identification codes to the list of stored identification codes. The at least one communication module updates the list of stored identification codes by addition of the identification codes when the identification codes are absent from the list and deletion of unreceived identification codes present in the list. Specifically, the list may be updated to include identification codes of all the containers in proximity of a communication module.

In an example, updating the list may include addition of identification codes therein, i.e. if a container is moved near (within proximity) to the communication module from a distant location, the identification code of such container would be added to the stored (or existing) list as a new addition. Similarly, updating the list includes deletion of identification codes therefrom. Specifically, if a container is moved away from the communication module to another distant location, the identification code of such container would not be received (i.e. a message from such container may not be received) by the communication module, and therefore identification code of such container may be deleted from the stored list. After updating, the at least one communication module transmits a second message to the server, the second message including the updated list of stored identification codes for the server to update the locations of the containers.

In one embodiment, the communication module is a second sensor unit of a second container. Specifically, the second sensor unit may be suitable for communicating with the plurality of containers and the server. In such embodiment, it may be evident that each of the sensor units of the plurality of the containers may not have similar communication means, specifically, the second sensor unit may be capable of communicating with the plurality of containers as well as with the server.

In one embodiment, the method further comprises detecting handling of the first container by a handler using the movement detector, and the first sensor unit obtaining a verified location from a mobile communication device associated with the handler. Specifically, whenever the first container is subjected to some movement, for example emptying the first container by a handler, a Global Positioning System (GPS) on the mobile communication device associated with the handler may be used to obtain the verified location of the first container.

In an embodiment, the term "handler" refers to a person responsible for handling (or managing) the container. For example, the handler may be service personnel responsible for emptying, relocating and cleaning of the container at regular intervals. Further, the term "verified location" may refer to verification of an exact location of the container using conventional location identification and tracking systems such as GPS. The exact location of a container may be determined using GPS on the mobile communication device associated with the handler and/or the fixed communication module in proximity of the container.

In another embodiment, the first sensor unit obtains a verified location from a mobile communication device within a range of communication of the first sensor unit. In such embodiment, the mobile communication device may be any portable device within the range of communication of the first sensor unit. For example, the mobile communication device may be a GPS enabled device mounted on a truck for garbage collection from the container. Otherwise, the mobile communication device may be associated with a person passing by the container or using the container. In such instance, the first sensor unit may obtain the verified location thereof using GPS on the person's mobile communication device.

Alternatively, if location of a container using GPS is not available, the location of the container may be estimated using Received Signal Strength Indicator (RSSI), message signal triangulation and/or length of time period of movement of the container. In an example, if a container may be moved at a maximum velocity of 5 meters per second, for a 10 second period of movement of the container, it may be estimated that the container has moved 50 meters away from the original location thereof.

As mentioned previously, the communication module may be a fixed communication module. In such embodiment, the method may further comprise the first sensor unit obtaining a verified location from the communication module. The verified location may be accurately determined using GPS of the fixed communication module.

In an embodiment, the first message (or messages) transmitted by sensor unit(s) further comprises information about movement detected by the movement detector since previous verified location. For example, the information about movement may include estimated distance of movement since last verified location, estimated accuracy of previous verified location, and so forth.

In an embodiment, each sensor unit of the group of containers receives the messages, performs the analysis of the messages, compares the received messages to the list of stored identification codes, updates the list and transmits it to the server. Therefore, each sensor includes the list of stored identification codes of neighbouring containers thereof. In such embodiment, sensor units of each container may be suitable for communication with each other and server.

DETAILED DESCRIPTION OF THE DRAWINGS

Referring to FIG. 1 illustrated is a block diagram of a system 100 for identifying a location or a change of location of a container within a group of containers, in accordance with an embodiment of the present disclosure. As shown, the system 100 includes a plurality of containers, such as containers 102, 104 and 106. Therefore, the system 100 is adapted to identify a change of location of at least one container, such as the container 102, within the group of containers 102-106. Each of the containers 102, 104, 106 includes a sensor unit (not shown) having communication means and a movement detector, and also includes an identification code. The containers 102, 104, 106 are communicably coupled to each other using a short range communication interface 120, specifically using the communication means thereof. The system 100 also includes at least one communication module, particularly, the system 100 includes a device 130 on which such communication module 132 is implemented. The containers 102, 104, 106 are communicably coupled to the device 130 using a long range communication interface 140. The system 100 also includes a server 150 communicably coupled to the device 130 using a long range communication interface 160.

Figure 2:
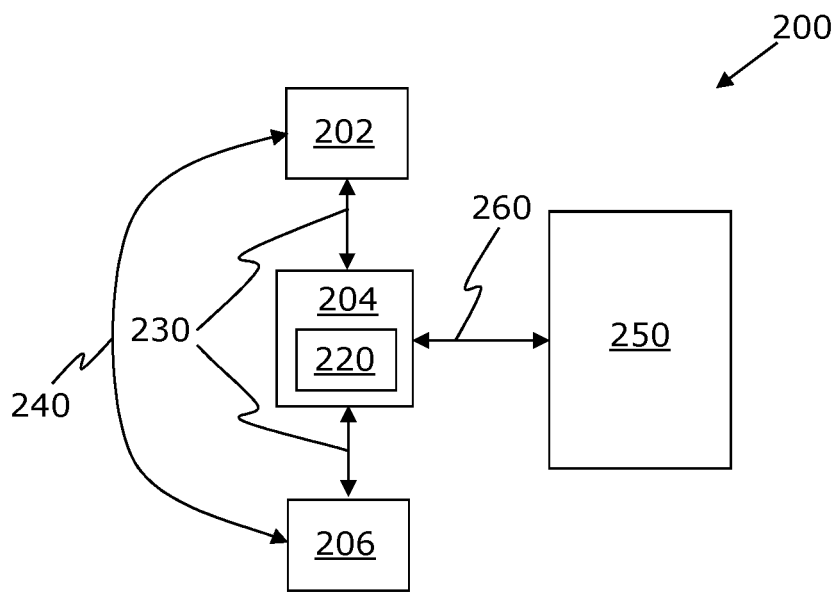
FIG. 2 is a block diagram of a system for identifying a change of location of a container within a group of containers, in accordance with another embodiment of the present disclosure.

Referring to FIG. 2, illustrated is a block diagram of a system 200 for identifying a location or a change of location of a container within a group of containers, in accordance with another embodiment of the present disclosure. As shown, the system 200 includes a plurality of containers, such as containers 202, 204 and 206. Each of the containers 202, 204, 206 include a sensor unit (not shown) having communication means and a movement detector, and also includes an identification code. Specifically, the container 204 (i.e. sensor unit thereof) includes a communication module 220, implemented thereon and operable to establish long range communication. Therefore, the container 204 is communicably coupled to containers 202, 206 using a long range communication interface 230. However, the containers 202, 206 are communicably coupled to each other using a short range communication interface 240. The system 200 also includes a server 250 communicably coupled to the container 204 using a long range communication interface 260.

Figure 3:
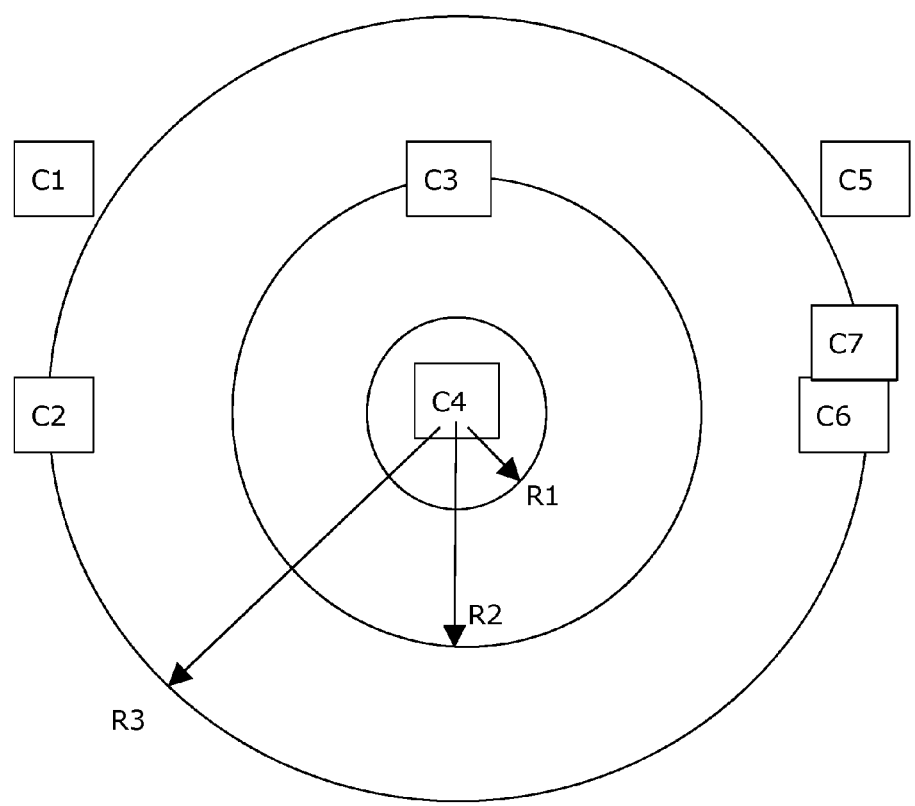
FIG. 3 is a block diagram depicting a group of containers, associated with multiple communication ranges, in accordance with another embodiment of the present disclosure.

Referring to FIG. 3, illustrated is a block diagram depicting a group of containers, such as containers C1-C7, associated with multiple communication ranges, in accordance with another embodiment of the present disclosure. As shown, the sensor C4 is adapted to operate in multiple communication ranges, shown with circular regions having radii R1, R2, and R3. Therefore, given below is a Table 1 depicting lists of identification codes that would be generated when the containers C1-C7 are operable to communicate with each other within the communication ranges, R1, R2, and R3. Specifically, the leftmost column depicts sensor identification codes (or IDs), and the second column (i.e. within range R1) depicts a list of identification codes that would be generated when each of the containers C1-C7 is operable to communicate within the communication range R1. Similarly, the third column (i.e. within range R2) depicts a list of identification codes that would be generated when each of the containers C1-C7 is operable within the communication range R2. Further, the fourth column (i.e. within range R3) depicts a list of identification codes that would be generated when each of the containers C1-C7 is operable within the communication range R3.

TABLE 1

| Sensor ID | within range R1 | within range R2 | within range R3 |
|---|---|---|---|
| C1 | NA | C2 | C2, C3 |
| C2 | NA | C1 | C1, C4 |
| C3 | NA | C4 | C1, C4, C5 |
| C4 | NA | C3 | C2, C3, C6, C7 |
| C5 | NA | C6, C7 | C3, C6, C7 |
| C6 | C7 | C5, C7 | C4, C5, C7 |
| C7 | C6 | C5, C6 | C4, C5, C6 |

Therefore, the above table represents various lists of stored identification codes that may be stored at a communication module, such as the communication modules 132, 220 of the FIGS. 1 and 2, respectively.

Figure 4:
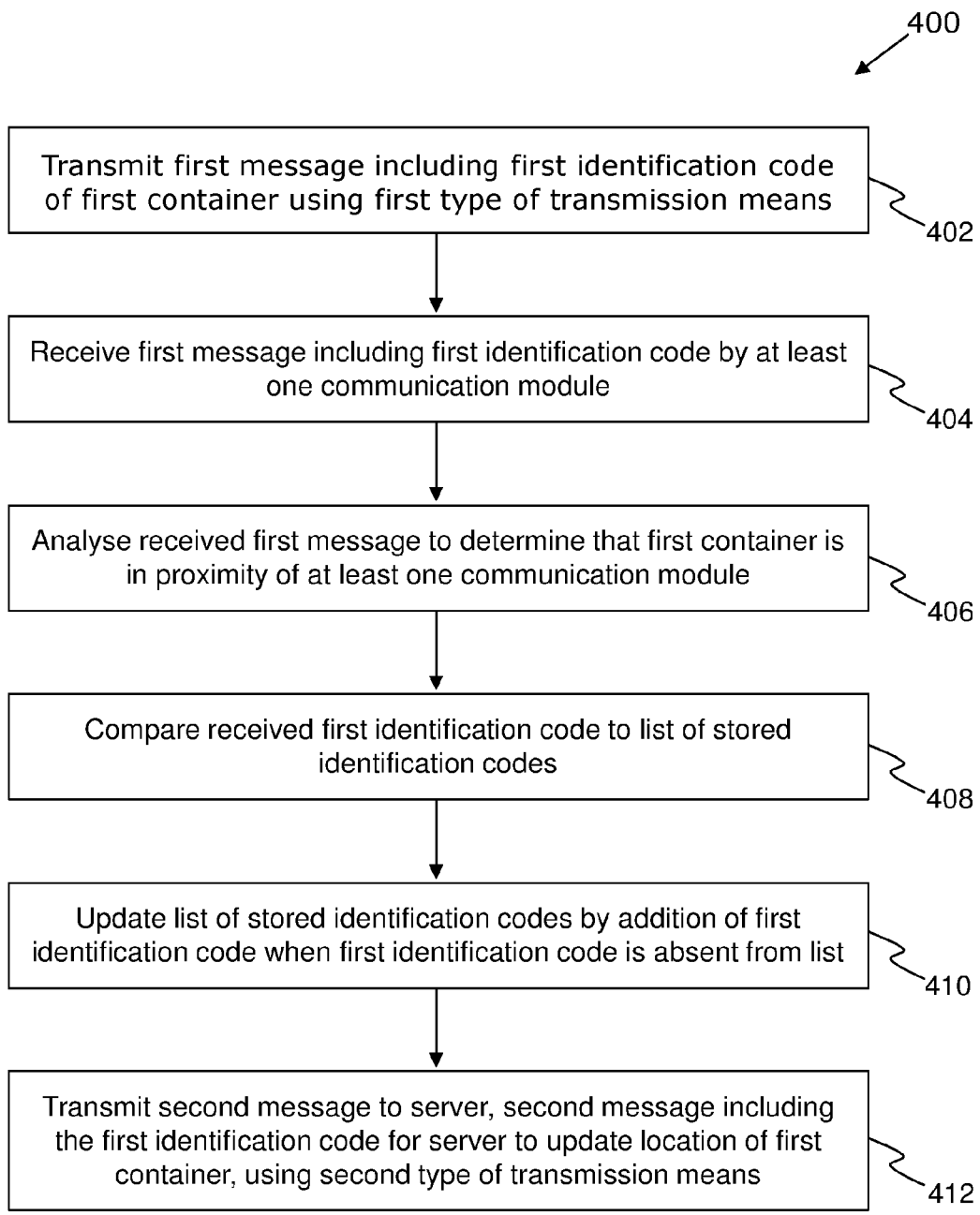
FIG. 4 is an illustration of steps of a method for identifying a change of location of a container within a group of containers, in accordance with another embodiment of the present disclosure.

Referring to FIG. 4, illustrated are steps of a method 400 for identifying a location or a change of location of a container within a group of containers, in accordance with another embodiment of the present disclosure. Those skilled in the art would recognize that the method 400 is associated with the operation of the systems 100, 200, explained herein above in conjunction with FIGS. 1-3. At step 402, a first message including a first identification code of a first container is transmitted using a first type of transmission means. At step 404, the first message including the first identification code is received by at least one communication module. At step 406, the received first message is analysed to determine that the first container is in proximity of the at least one communication module. At step 408, the received first identification code is compared to a list of stored identification codes. At step 410, the list of stored identification codes is updated by addition of the first identification code when the first identification code is absent from the list. At step 412, a second message is transmitted to a server, the second message including the first identification code for the server to update the location of the first container, using a second type of transmission means.

The steps 402 to 412 are only illustrative and other alternatives can also be provided where one or more steps are added, one or more steps are removed, or one or more steps are provided in a different sequence without departing from the scope of the claims herein. For example, the method 400 may comprise each sensor unit transmitting a message including identification code of each of the containers, and updating the list of stored identification codes may include deletion of unreceived identification codes present in the list. Further, in the method 400, the communication module may be a second sensor unit of a second container, and the method 400 may comprise detecting handling of the first container by a handler using the movement detector, and the first sensor unit may obtain a verified location from a mobile communication device associated with the handler. Further, in the method 400, the first sensor unit may obtain a verified location from a mobile communication device within a range of communication of the first sensor unit. Moreover, in the method 400, the communication module may be a fixed communication module and the method 400 may comprise the first sensor unit obtaining a verified location from the communication module. Further, in the method 400, the first message may further comprise information about movement detected by the movement detector since previous verified location. Furthermore, in the method 400, the communication module may be the second sensor unit of the second container and each sensor unit of the group of containers may receive the messages, may perform the analysis of the messages, may compare the received messages to the list of stored identification codes, and may update the list and transmit it to the server. Moreover, in the method 400, the first sensor unit may transmit the first message at predefined time intervals; otherwise the first sensor unit may transmit the first message upon request by the communication module. Also, in the method 400, the transmission of the second message may be performed via a mobile communication device. Additionally, in the method 400, the sensor unit may further comprise a fill level sensor and the first message may further comprise information about fill level of the container.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for identifying a location of a first container within a group of containers, each container comprising a sensor unit, the sensor unit comprising communication means and a movement detector, each container having an identification code, the method comprising:
   at least a first sensor unit of the first container transmitting a first message including a first identification code of the first container, using a first type of transmission means,
   at least a second communication module
      receiving the first message including the first identification code, and
      analysing the received first message to determine that the first container comprising the first sensor unit is in proximity of the at least second communication module,
      comparing the received first identification code to a list of stored identification codes,
      updating the list of stored identification codes by addition of the first identification code when said first identification code is absent from said list, and
      transmitting a second message to a server, the second message including the first identification code for the server to update the location of the first container, using a second type of transmission means.

2. A method according to claim 1, further comprising
   each sensor unit transmitting a message including identification code of each of the containers,
   the at least the second communication module
      receiving the messages including the identification code, and
      analysing the received messages to determine that the containers comprising the sensor units are in proximity of the at least second communication module,
      comparing the received identification codes to the list of stored identification codes,
      updating the list of stored identification codes by addition of the identification codes when said identification codes are absent from said list and deletion of unreceived identification codes present in said list,
      transmitting a second message to the server, the second message including the updated list of stored identification codes for the server to update the locations of the containers.

3. A method according to claim 2, wherein the second communication module is the second sensor unit of the second container and each sensor unit of the group of containers receives the messages, performs the analysis of said messages, compares the received messages to the list of stored identification codes, updates said list and transmits it to the server.

4. A method according to claim 1, wherein the second communication module is a second sensor unit of a second container, and the method comprises detecting handling of the first container by a handler using the movement detector, and the first sensor unit obtaining a verified location from a mobile communication device associated with the handler.

5. A method according to claim 4, wherein the first message further comprises information about movement detected by the movement detector since previous verified location.

6. A method according to claim 1, wherein the second communication module is a second sensor unit of a second container and the method comprises detecting handling of the first container by the handler using the movement detector, and the first sensor unit obtaining a verified location from a mobile communication device within a range of communication of the first sensor unit.

7. A method according to claim 1, wherein the second communication module is a fixed communication module and the method comprises the first sensor unit obtaining a verified location from the second communication module.

8. A method according to claim 1, wherein the first sensor unit transmits the first message at predefined time intervals.

9. A method according to claim 1, wherein the first sensor unit transmits the first message upon request by the second communication module.

10. A method according to claim 1, wherein the transmission of the second message is performed via a mobile communication device.

11. A method according to claim 1, wherein the sensor unit further comprises a fill level sensor and the first message further comprises information about fill level of the container.

12. A container system for identifying a location of a first container within the container system, the system comprising:
 a plurality of containers, each container comprising a sensor unit, the sensor unit comprising a movement detector and communication means, the movement detector being configured to detect movement of the container from a first location to a second location,
 a server comprising communication means,
 at least a second communication module configured to
  receive a first message from a first sensor unit, the message including a first identification code,
  analyse the received first message to determine that the first container comprising the first sensor unit is in proximity of the at least second communication module,
  compare the received first identification code to a list of stored identification codes,
  update the list of stored identification codes by addition of the first identification code when said first identification code is absent from said list, and
  transmit a second message to the server including the first identification code for the server to update the location of the first container.

13. A container system according to claim 12, wherein the movement detector is configured to detect handling of the first container by a handler, and the first sensor unit is configured to obtain a verified location from a mobile communication device associated with the handler.

14. A container system according to claim 12, wherein the movement detector is configured to detect handling of the first container by a handler, and the first sensor unit is configured to obtain a verified location from a mobile communication device within a range of communication of the first sensor.

15. A container system according to claim 12, wherein the second communication module is a fixed communication module and the first sensor unit is configured to obtain a verified location from the second communication module.

* * * * *